(12) United States Patent
Boberg et al.

(10) Patent No.: US 8,914,508 B2
(45) Date of Patent: Dec. 16, 2014

(54) METHOD AND APPARATUS FOR USE IN XML DOCUMENT MANAGEMENT ARCHITECTURE

(75) Inventors: Christer Boberg, Tungelsta (SE); Anders Lindgren, Älvsjö (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 387 days.

(21) Appl. No.: 12/745,218

(22) PCT Filed: Nov. 30, 2007

(86) PCT No.: PCT/EP2007/063099
§ 371 (c)(1),
(2), (4) Date: May 27, 2010

(87) PCT Pub. No.: WO2009/068114
PCT Pub. Date: Jun. 4, 2009

(65) Prior Publication Data
US 2010/0306361 A1 Dec. 2, 2010

(51) Int. Cl.
*G06F 15/173* (2006.01)
*H04L 29/12* (2006.01)
*H04L 29/08* (2006.01)

(52) U.S. Cl.
CPC ...... *H04L 29/12113* (2013.01); *H04L 61/1541* (2013.01); *H04L 67/16* (2013.01); *H04L 67/34* (2013.01)
USPC ............ 709/225; 370/254; 709/223; 709/226

(58) Field of Classification Search
CPC ................ H04L 29/12113; H04L 61/1541; H04L 67/34; H04L 67/16
USPC .......................................................... 709/225
See application file for complete search history.

(56) References Cited

U.S. PATENT DOCUMENTS

2007/0294409 A1\* 12/2007 Kumar ................ 709/226
2009/0080404 A1\* 3/2009 Laurila et al. ............. 370/348

FOREIGN PATENT DOCUMENTS

| CN | 1859402 A | 11/2006 |
| CN | 1866841 A | 11/2006 |

OTHER PUBLICATIONS

Giordano, M. "DNS-Based Discovery System in Service Oriented Programming", 2005, pp. 840-850, retrieved from http://www.springerlink.com/content/6qymbfw1bc3t18ar/fulltext.pdf on Nov. 5, 2011.\*
Open Mobile Alliance. XML Document management (XDM) Specification Candidate Version 2.0—Jul. 24, 2007, OMA-TS-XDM_Core-V2_0-20070724-C.
Veikkolainem, S. et al. A Simple Application Configuration Protocol. Jun. 2007.

(Continued)

*Primary Examiner* — Jude Jean Gilles
*Assistant Examiner* — Jaren M Means

(57) ABSTRACT

A method is provided for use in an XML Document Management Architecture. An Aggregation Proxy of Remote Network to use for accessing an XCAP document in the remote network is determined by performing a DNS lookup.

6 Claims, 5 Drawing Sheets

(56) References Cited

OTHER PUBLICATIONS

Rosenberg Cisco J: "The Extensible Markup Language (XML) Configuration Access Protocol (XCAP); rfc4825.txt" IETF Standard, Internet Engineering Task Force, IETF, CH, May 1, 2007, XP015052396.

Gulbrandsen Troll Technologies P Vixie Internet Software Consortium L Esibov Microsoft Corp A: "A DNS RR for specifying the location of services (DNS SRV); rfc2782.txt", Feb. 1, 2000, XP015008565.

Rosenberg Dynamicsoft H Schulzrinne Columbia U J: "Session Initiation Protocol (SIP): Locating SIP Servers; rfc3263.txt", Jun. 1, 2002, XP015009041.

"XML Document Management (XDM) Specification Candidate Version 2.0" Open Alliance, OMA-AD-XDM-V2-0-200-C; Jul. 24, 2007.

Saint-Andre P et al: "Extensible Messaging and Presence Protocol (XMPP): Core; rfc3920.txt", Oct. 1, 2004, XP015009693.

* cited by examiner

METHOD AND APPARATUS FOR USE IN XML DOCUMENT MANAGEMENT ARCHITECTURE

RELATED APPLICATION

This application is the U.S. national stage application of International Application No. PCT/EP2007/03099 filed on Nov. 30, 2007, the disclosure of which is incorporated herein by reference.

TECHNICAL FIELD

The present invention relates to a method and apparatus for use in the XML Document Management Architecture.

BACKGROUND

According to the Open Mobile Alliance (OMA) Architecture Document "XML Document Management Architecture" (currently at OMA-AD-XDM-V2_0-20070724-C; XML is an abbreviation for "Extensible Markup Language"), the XML Document Management (XDM) enabler defines a common mechanism that makes user-specific service-related information accessible to the service enablers that need them. Such information is expected to be stored in the network where it can be located, accessed and manipulated (e.g. created, changed, deleted, etc.). XDM specifies how such information will be defined in well-structured XML documents, as well as the common protocol for access and manipulation of such XML documents.

The XDM Specification ["XML Document Management (XDM) Specification", Version 2.0, Open Mobile Alliance, OMA-TS-XDM_Core-V2_0, URL: http://www.openmobilealliance.org/] defines the features of the XDM enabler, which include the following:

- The common protocol, XML Configuration Access Protocol (XCAP) [IETF RFC 4825 "The Extensible Markup Language (XML) Configuration Access protocol (XCAP)", J. Rosenberg, May 2007, URL: http://www.ietf.org/rfc/rfc4825.txt], by which Principals can store and manipulate their service-related data, stored in a network as XML documents.
- The SIP (Session Initiation Protocol) subscription/notification mechanism by which Principals can be notified of changes to such documents.
- The mechanism by which Principals can search service-related data stored in a network as XML documents using limited XQuery [W3C Recommendation "XQuery 1.0: An XML Query Language", Scott Boag et al, Jan. 23 2007, World Wide Web Consortium (W3C), URL: http://www.w3.org/TR/xquery].

Documents accessed and manipulated via XCAP are stored in logical repositories in the network, called XDMS (XDM Server). Each repository may be associated with a functional entity which uses its data to perform its functions.

Each XML document stored in an XDMS is described as an XCAP Application Usage, which enables applications to use the document via XCAP. The XDM enabler describes Application Usages which can be reused by multiple enablers and are stored in the Shared XDMSs, of which there are four types: Shared List XDMS, Shared Group XDMS, Shared Policy XDMS and Shared Profile XDMS. The documents supported by these XDMSs are as follows:

- URI List and Group Usage List documents in the Shared List XDMS ["Shared List XDM Specification", Version 2.0, Open Mobile Alliance, OMA-TS-XDM_Shared-V2_0, URL: http://www.openmobilealliance.org/];
- Group document in the Shared Group XDMS ["Shared Group XDM Specification", Version 1.0, Open Mobile Alliance, OMA-TS-XDM_Shared_Group-V1_0, URL: http://www.openmobilealliance.org/];
- User access policy document in the Shared Policy XDMS ["Shared Policy XDM Specification", Version 1.0, Open Mobile Alliance, OMA-TS-XDM_Shared_Policy-V1_0, URL: http://www.openmobilealliance.org/]; and
- User Profile document in the Shared Profile XDMS ["Shared Profile XDM Specification", Version 1.0, Open Mobile Alliance, OMA-TS-XDM_Shared_Profile-V1_0, URL: http://www.openmobilealliance.org/].

In addition to the above documents, the XDM Enabler also defines the Extended Group Advertisement.

Due to the reusable nature of the XDM enabler, there will be interactions with other service enablers, and therefore, the architectural design of the XDM enabler accommodates the needs of those enablers.

It can be seen that the XML Document Manager (XDM) provides an architecture for managing service specific data. The XML Document Management defines a common mechanism that makes user-specific service-related information accessible to the service enablers that need them. The service-specific information is expressed and exchanged by means of XML documents, and this information is stored in the network where it can be located, accessed and manipulated (created, changed, deleted, etc.). The network entity assumed responsible for storing and manipulation of such information is the XDM Server (XDMS).

FIG. 1 of the accompanying drawings illustrates some of the network entities defined in the above-referenced OMA Architecture Document. In FIG. 1, two XDM Clients 2-1 and 2-2 are in communication with respective different XDM Servers 6-1 and 6-2 via an Aggregation Proxy 4. The XDM Clients 2-1 and 2-2 are client entities that provide access to the various XDMS features. They provide an end user with the possibility to create, modify or delete an XML document, and by that create, modify or delete service specific data. The Aggregation Proxy 4 is the contact point for the XDM Clients 2-1 and 2-2 to access XML documents stored in any XDM Server; the Aggregation Proxy 4 performs functions like authentication or routing of requests. The XDM Servers 6-1 and 6-2 hold the service specific data, and implement the procedures to create, modify or delete such data.

FIG. 2 shows in more detail the currently-proposed XML Document Management Architecture solution, this Figure being extracted from the OMA-AD-XDM-V2_0-20070724-C document. Parts shown in FIG. 2 will now be described.

According to OMA-AD-XDM-V2_0-20070724-C, the Aggregation Proxy of FIG. 2 is the contact point for the XDMC (XDM Client) to access XML documents stored in any XDMS. The Aggregation Proxy performs the following functions: (a) performs authentication of the XDMC; (b) routes individual XCAP requests to the correct XDMS or Aggregation Proxy of Remote Network; (c) routes individual Search requests to the Search Proxy; (d) optionally performs compression/decompression; and (e) supports secure data transfer between the Aggregation Proxy and the Aggregation Proxy of Remote Network, using TLS or other means.

The Search Proxy of FIG. 2 is the contact point for the XDMC to search information from XML documents stored in any XDMS. The Search Proxy performs the following functions: (a) forwards search requests to the XDMS, also to the Aggregation Proxy of Remote Networks when needed; (b)

receives responses from the XDMS, and from the Aggregation Proxy of Remote Networks when needed; (c) combines results from the XDMS, and also from the Aggregation Proxy of Remote Networks before sending responses to the XDMC; (d) sends search responses to the XDMC; and (e) supports secure data transfer between Search Proxy and the Aggregation Proxy of Remote Network, using TLS or other means.

The Aggregation Proxy of Remote Network of FIG. 2 is the contact point for a trusted network to access XML documents stored in any XDMS of the remote network. The Aggregation Proxy of Remote Network performs the following functions: (a) performs authorization of the trusted network; (b) routes individual XCAP requests to the correct XDMS; (c) routes individual search requests to the Search Proxy; (d) optionally performs compression/decompression; (e) supports secure data transfer between the Aggregation Proxy of Remote Network and the trusted network, using TLS or other means.

The XDM-8 reference point of FIG. 2 is between the Aggregation Proxy and the Aggregation Proxy of Remote Network. The protocol for the XDM-8 reference point is XCAP. The XDM-8 reference point provides the following functions: (a) secure data transfer between the Aggregation Proxy and the Aggregation Proxy of Remote Network; and (b) forwarding of requests/responses to the Aggregation Proxy of Remote Network.

The XDM-9 reference point of FIG. 2 is between the Search Proxy and the

Aggregation Proxy of Remote Network. The protocol for the XDM-9 reference point is "Limited XQuery over HTTP". The XDM-9 reference point provides the following functions: (a) secure data transfer between the Search Proxy and the Aggregation Proxy of Remote Network; (b) forwarding of search requests/responses between the Search Proxy and the Aggregation Proxy of Remote Network.

In this OMA defined XDM solution it would be possible to fetch XCAP documents and search for information in XCAP documents in another operator's domain using an NNI (Network-to-Network Interface).

The traffic to the remote network is routed via an Aggregation Proxy entity of the remote network (Aggregation Proxy of Remote Network). The protocol used is HTTP over some secure transport, such as for example TLS (Transport Layer Security). The requesting network requires some kind of service agreement with the remote network in order to be accepted by the remote network.

The OMA defined solution for NNI between domains specifies that the address to the Aggregation Proxy of Remote Network is inserted using a configuration in the servers that contact the Aggregation Proxy of Remote Network.

The solution also assumes that other parameters like the XCAP Root URI of the remote domain is known by the calling servers.

As the name of an Aggregation Proxy of Remote Network may be changed by the service provider, this means that all other service providers that have a service agreement with this operator also must change their configuration.

There also exist situations when the service provider for a domain is changed from one service provider to another service provider. One example is when a user has their own domain and has an agreement with one service provider to host the XDM and SIP traffic for this domain and wants to change service provider.

It is desirable to address the above-mentioned issues.

SUMMARY

According to a first aspect of the present invention there is provided a method for use in an XML Document Management Architecture, comprising determining an Aggregation Proxy of Remote Network to use for accessing an XCAP document in the remote network, the Aggregation Proxy of Remote Network being determined by performing a DNS lookup.

The method may comprise performing a DNS lookup for an SRV record of the DNS provided particularly for the purpose of identifying an Aggregation Proxy of Remote Network and having a service name identifying it as such.

The method may comprise sending a DNS Query to obtain TXT information relating to the determined Aggregation Proxy of Remote Network.

The step of determining the Aggregation Proxy of Remote Network may comprise determining its host name and/or address.

The DNS lookup may specify a domain of the remote network.

The step of accessing may comprise at least one of: reading, creating, modifying and deleting.

The method may comprise performing the steps in an Aggregation Proxy and/or a Search Proxy of the local network.

According to a second aspect of the present invention there is provided an apparatus for use in an XML Document Management Architecture, comprising means for determining an Aggregation Proxy of Remote Network to use for accessing an XCAP document in the remote network, the Aggregation Proxy of Remote Network being determined by performing a DNS lookup.

The apparatus may comprise an Aggregation Proxy and/or a Search Proxy of the home network.

According to a third aspect of the present invention there is provided a Dynamic Name Server comprising at least one SRV record provided particularly for the purpose of identifying an Aggregation Proxy of Remote Network of an XML Document Management Architecture and having a service name identifying it as such.

The or each SRV record may comprise a host name or address of the Aggregation Proxy of Remote Network to which it relates.

The or each SRV record may comprise an indication of a domain that is served by the Aggregation Proxy of Remote Network to which it relates.

The Dynamic Name Server may comprise at least one TXT record for holding additional information relating to an Aggregation Proxy of Remote Network.

According to a fourth aspect of the present invention there is provided a program for controlling an apparatus to perform a method according to the first aspect of the present invention or which, when loaded into an apparatus, causes the apparatus to become an apparatus according to the second or third aspect of the present invention. The program may be carried on a carrier medium. The carrier medium may be a storage medium. The carrier medium may be a transmission medium.

According to a fifth aspect of the present invention there is provided an apparatus programmed by a program according to the fourth aspect of the present invention.

According to a sixth aspect of the present invention there is provided a storage medium containing a program according to the fourth aspect of the present invention.

By using an embodiment of the present invention it is no longer required to change the configuration in all severs in all domains that have an agreement with a certain domain to fetch or search for XCAP data (which is currently the case). It is sufficient to change data in one place in the network: that is in the DNS server serving the remote domain. It is also possible to have "service provider portability" for a domain in a simple way as it is only required to update one's own DNS when changing service provider for one's own domain.

DETAILED DESCRIPTION

An embodiment of the present invention provides a solution to the detection of remote XDM Aggregation Proxy servers (Aggregation Proxies of Remote Network) and their configuration for a domain by using the DNS (Domain Name System; see RFC 2181 at http://www.ietf.org/rfc/rfc2181.txt and RFC 2782 at http://www.ietf.org/rfc/rfc2782.txt). DNS is used to keep track of the host name of the Aggregation Proxy of Remote Network and other parameters related to the remote XDM service.

This is functionality is provided in an embodiment of the present invention by defining a new SRV record (or Service record; see RFC 2782). According to RFC 2782, a SRV record holds the following information:

Service: the symbolic name of the desired service.
Proto: the symbolic name of the desired protocol.
Name: The domain this record refers to.
TTL: standard DNS time to live field [RFC 1035].
Class: standard DNS class field [RFC 1035].
Priority: the priority of this target host.
Weight: a relative weight for entries with the same priority.
Port: the port on this target host of this service.
Target: the domain name of the target host.

An embodiment of the present invention defines a new type of SRV record with a new service name, e.g. "remote_XDM", in the DNS, and a number of new TXT keys (see RFC 1464 at ftp://ftp.rfc-editor.org/in-notes/rfc1464.txt), e.g. "RemoteXCAPURI=" related to the Aggregation Proxy of Remote Network. DNS TXT records are used to store arbitrary name/value pairs conveying additional information about the named service; certain protocols use this field to store protocol-specific data. In this context, "remote_XDM" is used to supply the actual host address of the Aggregation Proxy of Remote Network that is serving a certain domain.

In an embodiment of the present invention, before a server contacts an Aggregation Proxy of Remote Network, it performs a DNS lookup for the SRV record of a remote domain using the service name "remote_XDM" to obtain the host name/address of the server. It then uses this host address to find and contact the correct physical server. The defined TXT record include keys the calling server will use to fetch other dynamic data needed for the connection to the domain.

As a specific example, a server that needs to contact an Aggregation Proxy of Remote Network performs a DNS Query of the type:

_remote_XDM._tcp-ericsson.com, QCLASS=IN, QTYPE=SRV to obtain the host address of the Aggregation Proxy of Remote Network serving domain=ericsson.com. The server will also perform a DNS QUERY for QTYEP=TXT to obtain the other parameters.

Figure 1:
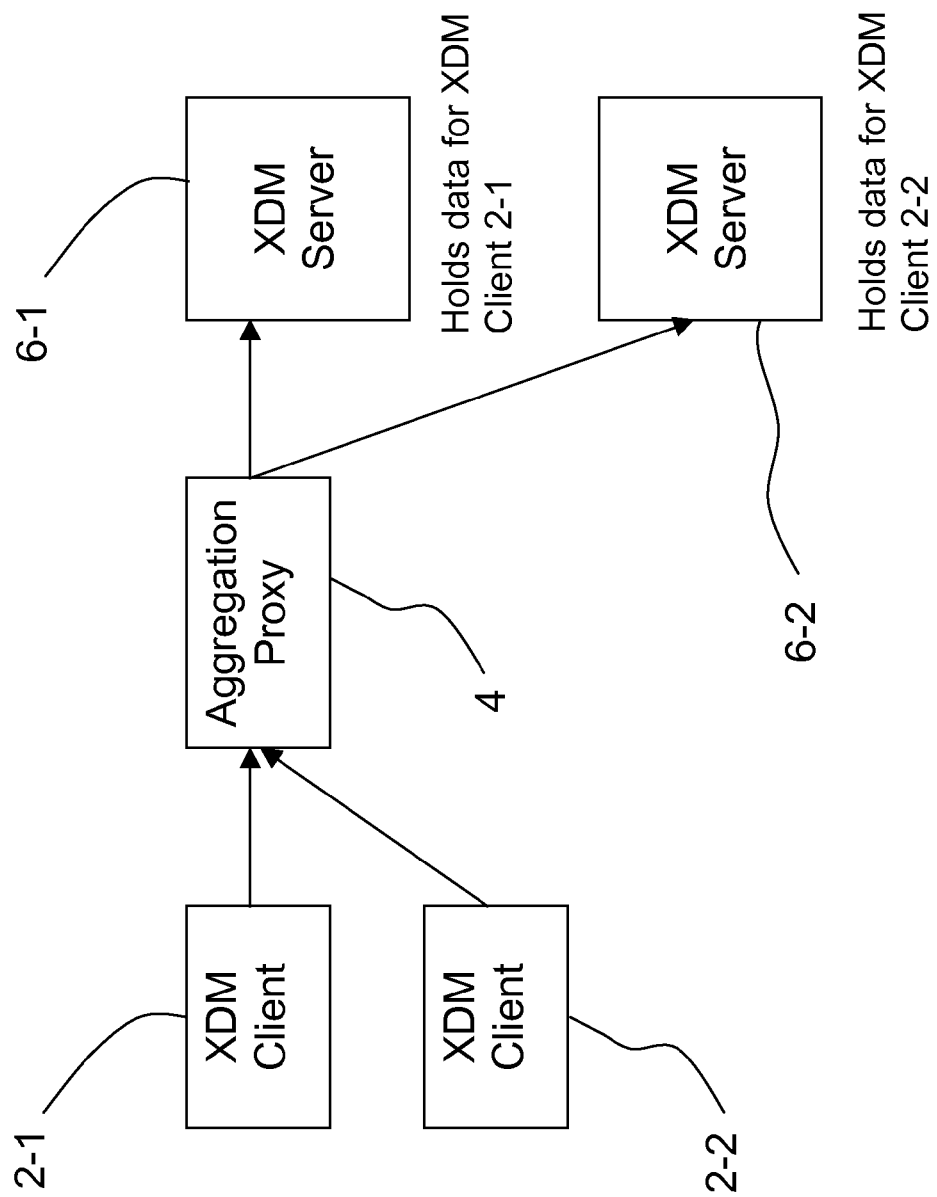
FIG. 1, discussed hereinbefore, is a block diagram schematically illustrating network entities of an existing XML Document Management Architecture solution.
Figure 2:
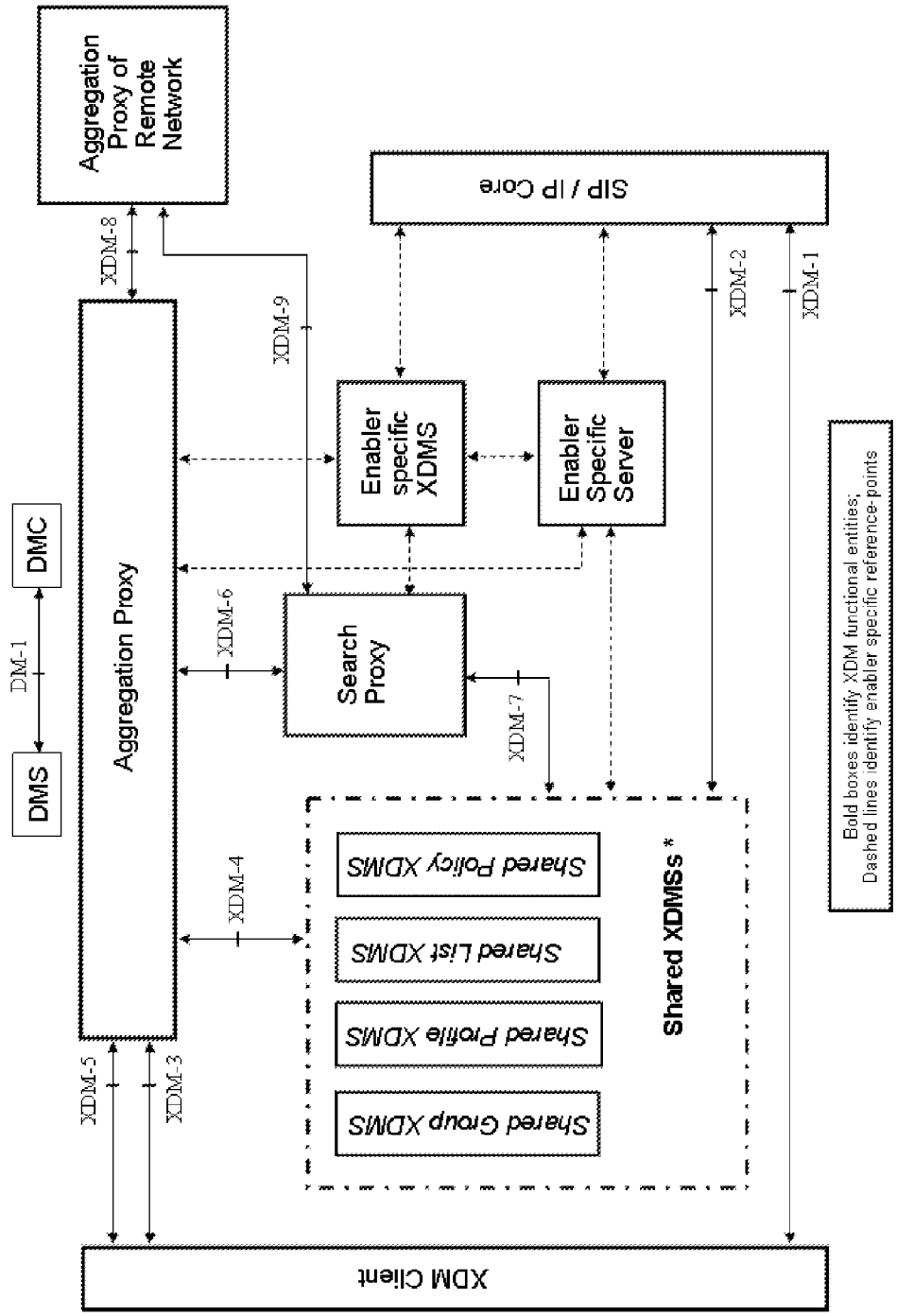
FIG. 2, also discussed hereinbefore, shows the currently-proposed XML Document Management Architecture solution in more detail, and is from OMA-AD-XDM-V2_0-20070724-C.
Figure 3:
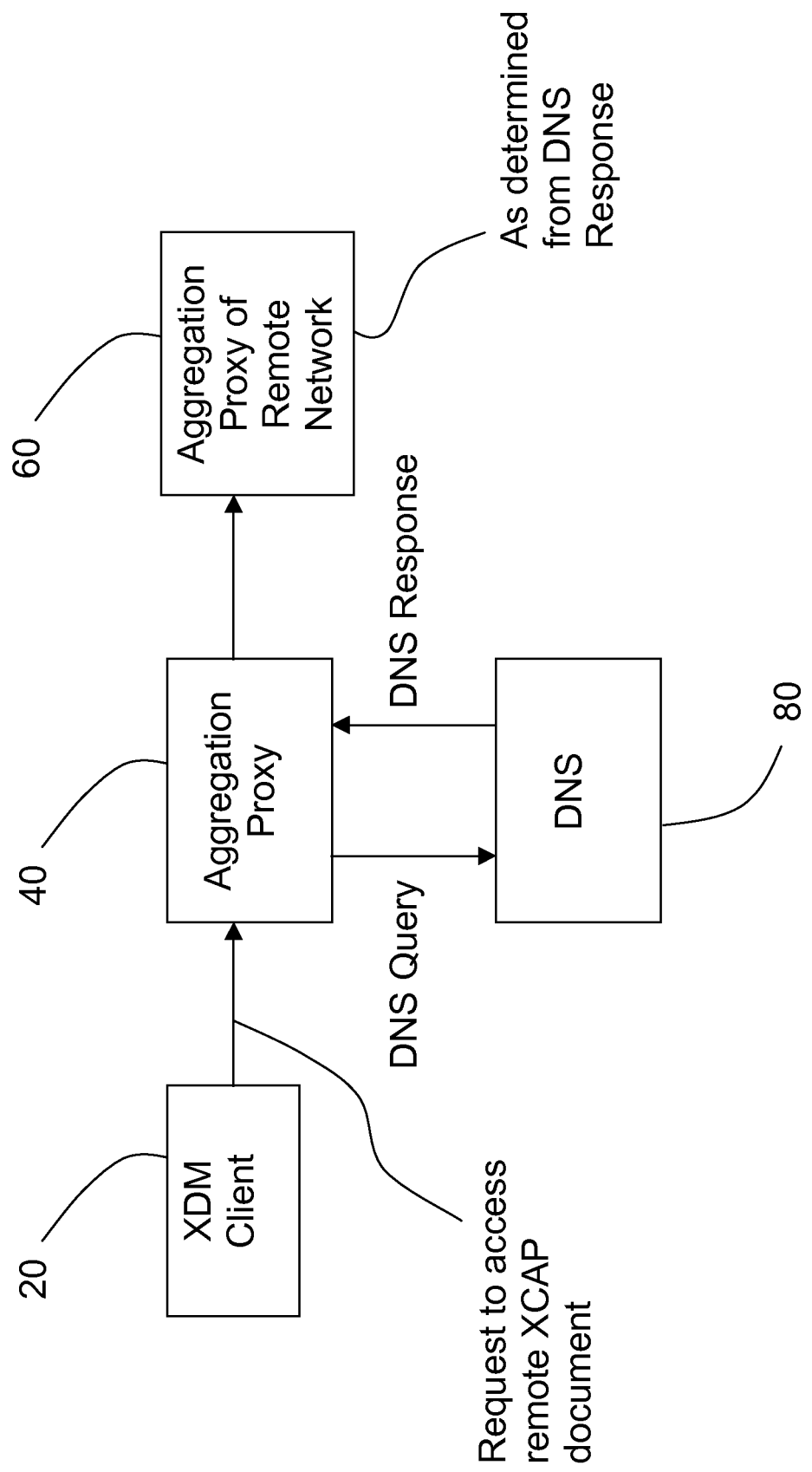
FIG. 3 is a schematic block diagram illustrating parts of an embodiment of the present invention.
Figure 4:
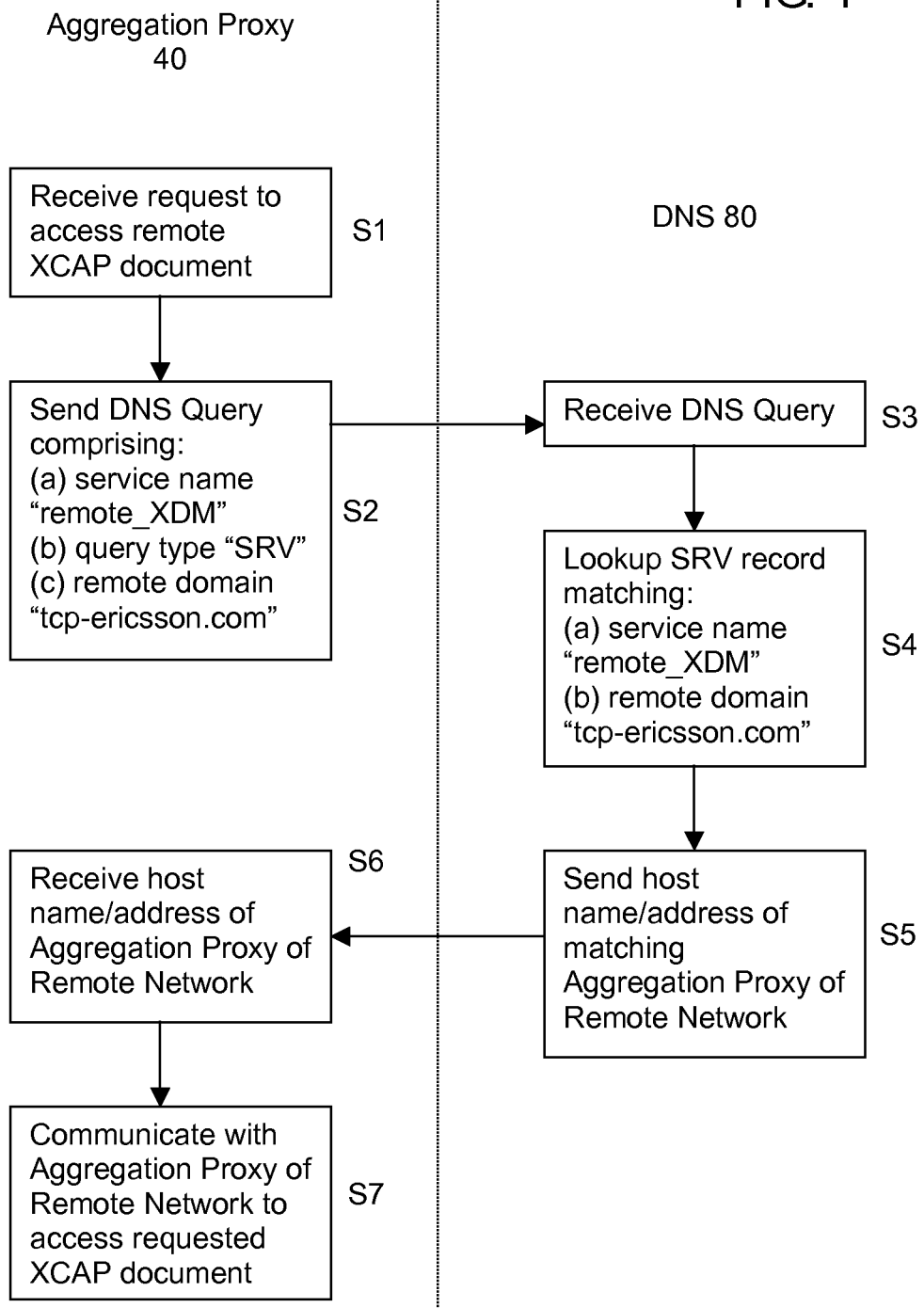
FIG. 4 is a schematic flowchart illustrating steps performed in an embodiment of the present invention.
Figure 5:
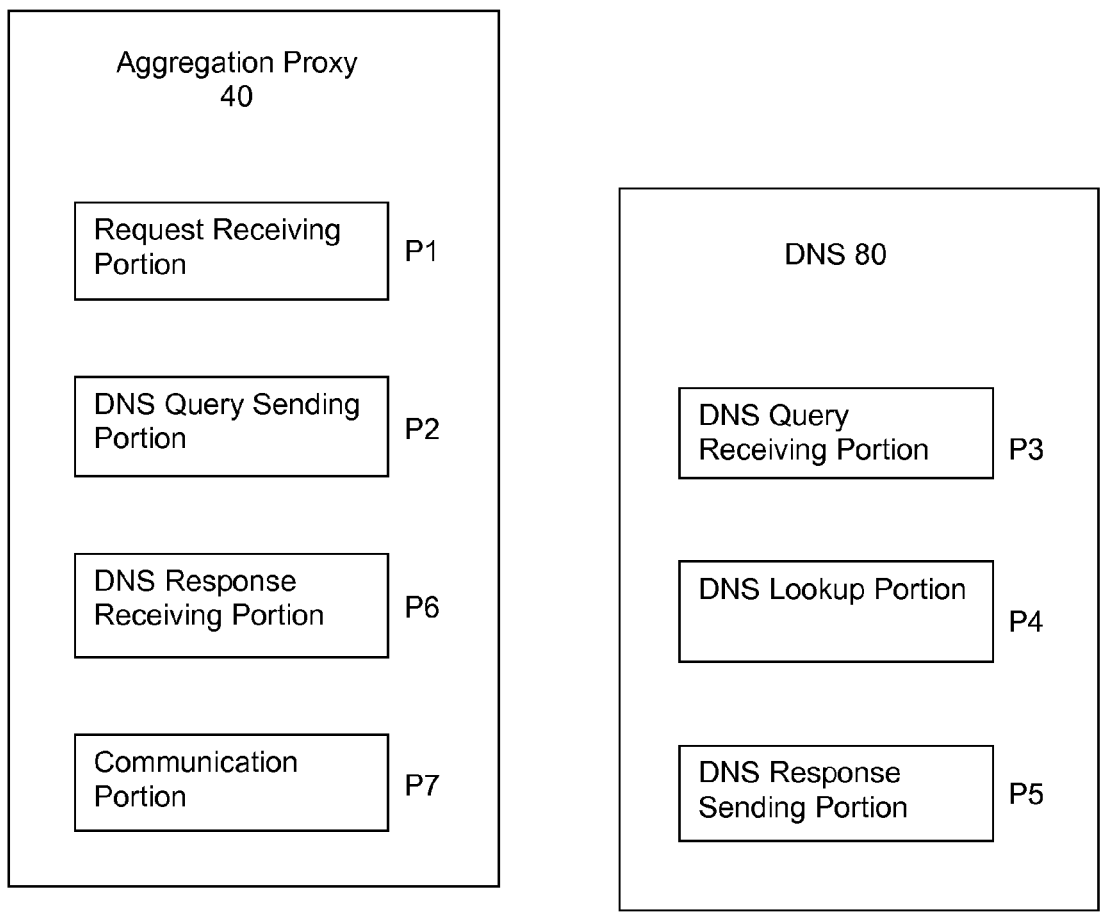
FIG. 5 is a schematic block diagram illustrating parts of an embodiment of the present invention in more detail.

FIG. 3 is a schematic block diagram illustrating parts of an embodiment of the present invention. FIG. 4 is a schematic flowchart illustrating steps performed in an embodiment of the present invention. FIG. 5 is a schematic block diagram illustrating parts of an embodiment of the present invention in more detail.

Referring to FIGS. 3 to 5, an XDM Client 20 is in communication with a (local) Aggregation Proxy 40 to request access to (e.g. to read, create, modify or delete) an XCAP document in a remote network. This request is received in step S1 by the Aggregation Proxy 40. In step S2, the Aggregation Proxy 40 sends a DNS Query to the DNS 80, which is received in step S3 by the DNS 80. The DNS Query comprises at least the service name (e.g. "remote_XDM"), query type (e.g. "SRV") and the remote domain (e.g. "tcp-ericsson.com") to enable the DNS 80 to determine a suitable Aggregation Proxy of Remote Network to be used.

In step S4, the DNS 80 performs a lookup to find an SRV record that matches the information received in the DNS Query in step S3, and this results in the Aggregation Proxy of Remote Network 60 being identified. Details of the Aggregation Proxy of Remote Network 60 found in step S4 are sent to the Aggregation Proxy 40 in step S5, such as the host name and/or address of the Aggregation Proxy of Remote Network 60.

These details are received by the Aggregation Proxy 40 in step S6, and this allows the Aggregation Proxy 40 to arrange for access to be provided for the XDM Client 20 to the requested XCAP Document via the Aggregation Proxy of Remote Network 60 determined from the DNS lookup.

Parts of the Aggregation Proxy 40 and DNS 80 for performing the steps of FIG. 4 are illustrated schematically in FIG. 5, with parts P1 to P7 of FIG. 5 being adapted to perform the steps S1 to S7 respectively of FIG. 4.

Although FIGS. 3 to 5 describe a situation in which the (local) Aggregation Proxy 40 is performing a DNS lookup before contacting the Aggregation Proxy of Remote Network 60, an embodiment of the present invention applies equally to any server in the local network that has a need to contact an Aggregation Proxy of Remote Network; for example a Search Proxy can also perform such a DNS lookup in a corresponding manner. A local Aggregation Proxy might be used when an XDMC needs to access a remote domain. This is one of the advantages with a solution according to an embodiment of the present invention: it is not required to configure every server that might need to contact an Aggregation Proxy of Remote Network with the hostname of the Aggregation Proxy of Remote Network for every domain.

It will be appreciated that operation of one or more of the above-described components can be controlled by a program operating on the device or apparatus. Such an operating program can be stored on a non-transitory computer-readable medium.

The invention claimed is:

1. A method for use in an Extensible Markup Language (XML) Document Management Architecture, comprising determining an Aggregation Proxy of Remote Network to use for accessing an XML Configuration Access Protocol (XCAP) document in the remote network, the Aggregation Proxy of Remote Network being determined by performing a Domain Name Server (DNS) lookup, wherein the method further comprising: using a service name "remote XDM" to perform a DNS lookup for a Service Record (SRV) record of the DNS provided particularly for the purpose of identifying an Aggregation Proxy of Remote Network and having a service name identifying it as such, wherein the "remote XDM" is used to supply the actual host address of the Aggregation Proxy of Remote Network that is serving a certain domain.

2. The method of claim 1, comprising sending a DNS Query to obtain Text (TXT) information relating to the determined Aggregation Proxy of Remote Network.

3. The method of claim 1, wherein determining the Aggregation Proxy of Remote Network comprises determining its host name and/or address.

4. The method of claim 1, wherein the DNS lookup specifies a domain of the remote network.

5. The method of claim 1, wherein accessing comprises at least one of: reading, creating, modifying and deleting.

6. The method of claim 1, comprising performing the steps in an Aggregation Proxy and/or a Search Proxy of the local network.

\* \* \* \* \*

UNITED STATES PATENT AND TRADEMARK OFFICE
CERTIFICATE OF CORRECTION

PATENT NO. : 8,914,508 B2
APPLICATION NO. : 12/745218
DATED : December 16, 2014
INVENTOR(S) : Boberg et al.

Page 1 of 1

It is certified that error appears in the above-identified patent and that said Letters Patent is hereby corrected as shown below:

In the Specification

In Column 1, Line 8, delete "PCT/EP2007/03099" and insert -- PCT/EP2007/063099 --, therefor.

Signed and Sealed this
Twenty-eighth Day of July, 2015

Michelle K. Lee
*Director of the United States Patent and Trademark Office*